Sept. 24, 1940.   J. EGGERT ET AL   2,215,578
EQUALIZATION OF PHOTOGRAPHIC BAND FILMS
Filed May 4, 1937

John Eggert
Gerd Heymer
Inventors

By Their Attorneys

Patented Sept. 24, 1940

2,215,578

UNITED STATES PATENT OFFICE 2,215,578

EQUALIZATION OF PHOTOGRAPHIC BAND FILMS

John Eggert, Leipzig, and Gerd Heymer, Wolfen, Germany, assignors, by mesne assignments, to General Aniline & Film Corporation, New York, N. Y., a corporation of Delaware Application May 4, 1937, Serial No. 140,638
In Germany May 7, 1936

2 Claims. (Cl. 242—71)

This invention relates to the equalization of photographic band films.

One of its objects is an apparatus for winding two films lying one on the other from one spool onto another. Another object is a casette for a cinematographic film for accommodating two films lying one on the other. Further objects will be seen from the detailed specification following hereafter.

Figure 1:
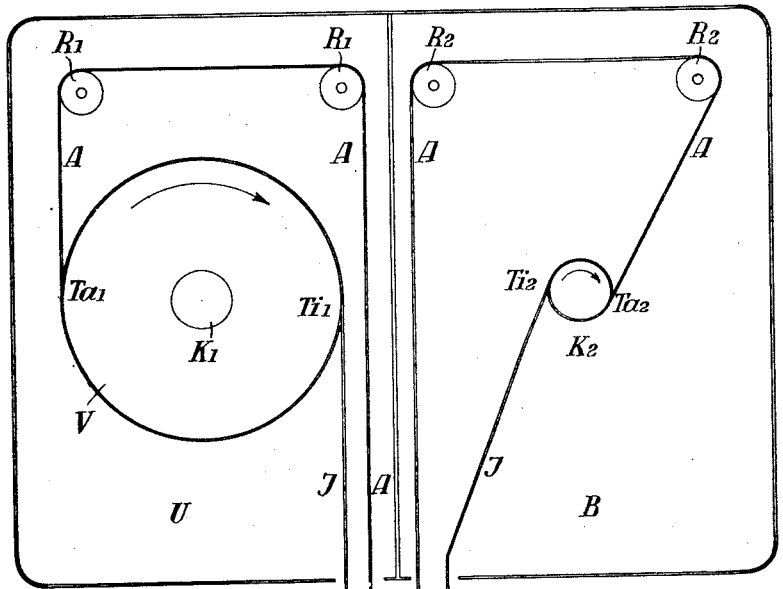
Figure 2:
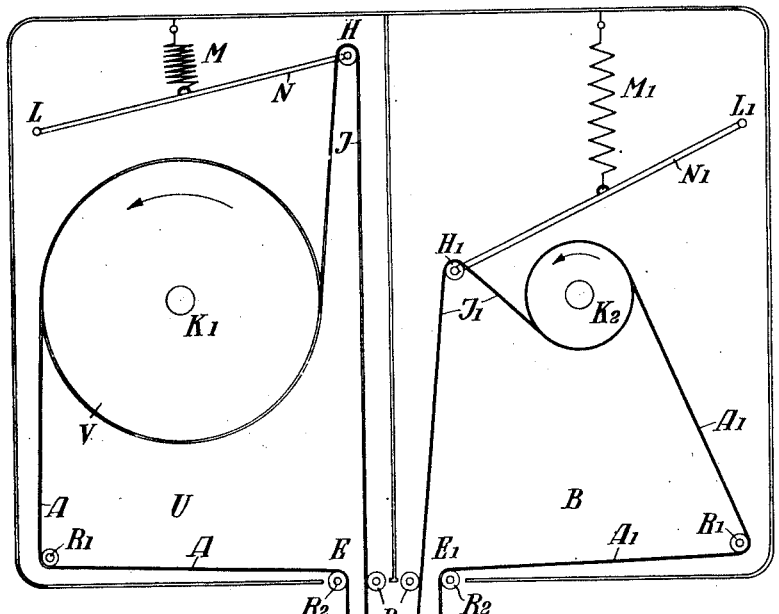

Reference is made to the accompanying drawing in which Fig. 1 and Fig. 2 show casettes for a bipack cinematographic film.

There are several methods by which two cinematographic films lying one upon the other may be together guided through the picture window of a camera or projector; this is a requirement in some trick methods and in many color films (bipack films). There is difficulty in unwinding the two films from the supply roll and winding them on the receiving spool. It is not possible without special precautions to unwind both films on a roller and to rewind them on another roller since the outer film is always somewhat longer than the inner film and the difference of film length in the case of a thick film roll becomes considerable. The films which have passed through the window and have been exposed have after a short time a noticeable difference of length. To avoid this difficulty it has been proposed to provide a separate winding and unwinding device for each of the two films of the bi-pack.

By this invention the difference of length in the winding and unwinding of two films together from the same supply roll and onto the same receiving roll is avoided by arranging that the lines at which the ends of the two films leave the supply roll and the lines at which they arrive at the receiving roll are in each case diametrically opposite each other. This at first surprising result which affords a particularly simple solution of the difficulty becomes understandable on considering as follows: If one thinks of two films wound together on a roll and separates one winding from the outside lying film the previously inside lying film becomes the outside one. By removing the one film turn the diameter of the film roll measured on the length of the turn removed is practically not diminished. Since the previously inside lying film turn is now the outside one it must be practically as much longer than the next (now inside) lying turn of the original outer film. It follows that the difference of length of two adjacent turns of both films wound on one roller must be exactly equal to half the periphery of the film winding. The essential feature of the invention therefore consists in so placing the line at which the film leaves the supply roll and the line at which the film arrives at the receiving roll that these lines for the one film are diametrically opposite the lines for the other film on the respective spools. In this case neither of the two films takes precedence, since neither of them is outer and neither inner. It is possible in this way to avoid the aforesaid variable film guide proposed for equalizing the variable difference of length.

Figure 1 is for example a form of the invention showing in longitudinal section a casette for a bipack cinematograph film. The supply roll V is wound on the spool $K_1$ and consists of the two films A and J lying one over the other. The film J leaves the roll at $T_{j1}$ placed directly above the exit slot $S_1$ while the film A leaves the roll at the point $T_{a1}$ in tangential direction and is guided over the rollers $R_1$ to the exit slot $S_1$. At $S_2$ both films enter the receiving chamber. The film J proceeds directly to the receiving spool $K_2$ onto which it runs along the line $T_{j2}$ while the film A passes over the guide rolls $R_2$ to be wound on the receiving spool at the line $T_{a2}$. It will be seen that $T_{j2}$ and $T_{a2}$ are diametrically opposite to each other.

The simple guiding of the film described only has the desired result when both of the films unwound from the one roll and wound up on the other roll are of the same thickness. If the front film and the back film are of different thickness it is preferable to use the additional compensating device indicated in Figure 2. Here the film lying outside on the roll is guided to form a loop of which the length varies in dependence on the amount of film which is unwound or wound up. This may be achieved for instance by guiding the outer film over a spring roller producing the loop on its way to the device that guides it to the picture window, while the inner lying film runs from the supply roll over fixed rollers to the same part of the film guide; the same arrangement of rollers is provided for the receiving spool and the films travel over them in like manner as they are received on the roll.

The loop formed by the outer lying film is thus held constantly under a certain tension to which, however, the roller maintaining the path of the loop can yield in the same degree as the difference between the two films diminishes or increases.

As before the casette comprises two chambers U and B light-tight in respect to each other. In the chamber U are the unexposed films A and J which are wound on the common spool $K_1$. The inner film A is drawn over the roller $R_1$ to the exit E of the casette where it passes over a second roller $R_2$ or over light-tight plush strips to leave the casette. In order to ensure that the inner lying film J on its way to the exit slot E where it runs over a roller $R_3$ or over plush strips shall be about the same length as the film A there is provided the roller H over which the film runs and which is mounted on a lever N centered at the point L. The spring M keeps the loop of the film J constantly in tension. In the receiving compartment B there is a corresponding device with the difference that the loop J of the inner film over the roller $H_1$ is small at the beginning of the winding on operation while the loop J on the supply side has its greatest length at the beginning of the unwinding, as will be noted from inspection of Fig. 2. By the fact that in the progressive unwinding of the two films from the spool $K_1$ and their winding up on the spool $K_2$ the difference of length of the wound film on the unwinding side is always decreasing, while on the winding up side it increases the loop forming roller H is automatically drawn downwards on the unwinding side whereas the corresponding roll $H_1$ on the winding up side is continuously drawn upwards by the spring $M_1$ and the loop $J_1$ is increased. By the change of position of the rolls H and $H_1$ the leaving point or the arrival point of the films can be varied by means of the movable loop. Advantageously the rollers may be arranged in the following manner: By the adjustment the place at which the film A runs on to the roll may be approximated to that at which the second film J runs on whereby in the case considered the inner film for example A is longer. The position of the spring roller is then so arranged that the film A is shorter. By the approximation of the positions of running on a kind of equilibrium must be produced in consequence of the counter-action of the two effects. In the part of the film outside the slots E and $E_1$ there does not arise a difference of length between the two films owing to the guiding device of the invention.

The invention has been described as applied to a casette for cinematographic films. It can also be used in similar manner in the guiding of picture bands without a casette in cinematograph exposure and reproduction apparatus, in copying machines or the like in which the films or casettes are wound directly and on to film spools.

What we claim is:

1. In a device of the character described, a cassette for accommodating two films superimposed and wound together on a supply spool, said cassette comprising two chambers each of which is provided with a spool one of said spools being said film supply spool and the other being the receiving spool, and each of which chambers is further provided on one side of each spool with a spring urged element and a roller mounted on said element and on the other side of each spool with a fixed roller such that one of said films in passing over said spring urged roller in each instance may form a loop on leaving said supply spool and on arriving at said receiving spool while the other film forms a loop in passing over said fixed rollers in each instance, and a device for guiding said films out of one chamber into the other.

2. In a device of the character described, a casette for accommodating two films superimposed and wound together on a supply spool, said casette comprising two chambers each of which is provided with a spool one of said spools being said film supply spool and the other being the receiving spool, and each of which chambers is further provided on one side of each spool with a spring urged element and a roller mounted on said element and on the other side of each spool with a fixed roller such that one of said films in passing over said spring urged roller in each instance may form a loop on leaving said supply spool and on arriving at said receiving spool while the other film forms a loop in passing over said fixed rollers in each instance, and a device for guiding said films out of one chamber into the other, the last line of contact of one film in leaving said supply spool being diametrically opposite the last line of contact of the other film leaving said supply spool and the same relationship obtaining between the first lines of contact of the films respectively as they pass onto the receiving spool.

JOHN EGGERT.
GERD HEYMER.